(12) United States Patent
Kumar et al.

(10) Patent No.: US 10,468,883 B2
(45) Date of Patent: Nov. 5, 2019

(54) METHOD AND SYSTEM FOR FACILITATING OPTIMIZATION OF ENERGY IN A DISTRIBUTED ENVIRONMENT

(71) Applicants: Awadhesh Kumar, Mumbai (IN); Biswadip Paul, Mumbai (IN)

(72) Inventors: Awadhesh Kumar, Mumbai (IN); Biswadip Paul, Mumbai (IN)

(*) Notice: Subject to any disclaimer, the term of this patent is extended or adjusted under 35 U.S.C. 154(b) by 0 days.

(21) Appl. No.: 15/672,034

(22) Filed: Aug. 8, 2017

(65) Prior Publication Data
US 2018/0041032 A1  Feb. 8, 2018

(30) Foreign Application Priority Data

Aug. 8, 2016 (IN) .............................. 201621027010

(51) Int. Cl.
*H02J 3/14* (2006.01)
*G06Q 50/06* (2012.01)
*G05B 13/02* (2006.01)
*H02J 3/00* (2006.01)

(52) U.S. Cl.
CPC .............. *H02J 3/14* (2013.01); *G05B 13/026* (2013.01); *G05B 13/0285* (2013.01); *G06Q 50/06* (2013.01); *H02J 2003/003* (2013.01)

(58) Field of Classification Search
CPC .... H02J 3/14; H02J 2003/003; G05B 13/026; G05B 13/0285; G06Q 50/06
See application file for complete search history.

(56) References Cited

U.S. PATENT DOCUMENTS

| 7,698,233 | B1* | 4/2010 | Edwards | G06Q 10/04 705/412 |
|---|---|---|---|---|
| 8,600,572 | B2 | 12/2013 | Sri-Jayantha | |
| 9,983,041 | B1* | 5/2018 | Jerphagnon | A01G 25/16 |
| 2010/0179704 | A1* | 7/2010 | Ozog | G06Q 10/06315 700/291 |
| 2011/0276269 | A1* | 11/2011 | Hummel | H02J 3/383 702/3 |
| 2011/0307109 | A1* | 12/2011 | Sri-Jayantha | G06Q 50/06 700/291 |
| 2012/0150679 | A1 | 6/2012 | Lazaris | |

(Continued)

*Primary Examiner* — Thomas C Lee
*Assistant Examiner* — Anzuman Sharmin
(74) *Attorney, Agent, or Firm* — HM Law Group LLP; Vani Moodley, Esq.

(57) ABSTRACT

Disclosed is a real-time decision support system for facilitating optimization of in a distributed environment. A data capturing module for capturing data from a plurality of data sources at a predefined interval of time. The data is captured pertaining to a specific domain and a specific geographical area. A forecasting module for forecasting demand of energy to be consumed by energy utilities in the specific domain and the geographical area upon analyzing the data. A position gap determination module for determining a position gap indicating a difference between the demand of energy and supply of energy. An energy optimization module for identifying at least one energy pool, from a plurality of energy pools, for retrieving a deficit of the demand of energy and providing the deficit of the demand of energy retrieved from the at least one energy pool in order to bridge the position gap.

9 Claims, 6 Drawing Sheets

(56) References Cited

U.S. PATENT DOCUMENTS

2014/0277797 A1* 9/2014 Mokhtari ............ G06Q 30/0202
 700/291
2014/0336960 A1* 11/2014 Haghighat-Kashani .....................
 G06Q 10/04
 702/60
2015/0324935 A1* 11/2015 Chiba ....................... H02J 3/32
 700/291

\* cited by examiner

METHOD AND SYSTEM FOR FACILITATING OPTIMIZATION OF ENERGY IN A DISTRIBUTED ENVIRONMENT

REFERENCE TO RELATED APPLICATIONS

This patent application claims priority from Indian Application No. 201621027010 filed on 8 Aug. 2016, the entirety of which is hereby incorporated by reference.

TECHNICAL FIELD

The present disclosure in general relates to a field of managing demand and supply of energy. More specifically, a method and a system for facilitating optimization of energy in a distributed environment.

BACKGROUND

With impetus on going green, energy mix is changing rapidly. Today, the energy mix is getting a lot more volatile given the very nature of such energy sources like Wind and Solar as they are exposed to prevailing weather condition. Unlike traditional sources such as thermal generation systems which typically have spinning reserve; all such integrated and/or synchronized energy sources contribute to the overall grid inertia. With depleting grid inertia, any imbalance in power position either due to demand side or the supply side creates havoc to the grid frequency. It may be noted that the demand of energy has always been volatile as they are exposed to exogenous factors such as weather changes. With supply of energy also getting volatile, maintaining the grid health is becoming more and more challenging and costlier day by day.

The situation may become much more challenging as in today's world where consumers are themselves become energy generators, it becomes much more difficult to monitor and manage such a vast network having enormous number of generation units. While smart meters and/or smart grids are enabled to capture such data in real time and gives two-way control on the grid, there is a growing need for real time intelligence to be drawn from such data for more proactive and efficient decision making by the energy utilities across the value chain i.e. generation, distribution and transmission.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts for facilitating optimization of energy in a distributed environment and the concepts are further described below in the detailed description. This summary is not intended to identify essential features of the disclosure nor is it intended for use in determining or limiting the scope of the disclosure.

In one implementation, a real-time decision support system for facilitating optimization of energy in a distributed environment is disclosed. In one aspect, the real-time decision support system may comprise a processor and a memory coupled to the processor. The processor may execute a plurality of modules stored in the memory. The plurality of modules may comprise a data capturing module, a forecasting module, a position gap determination module, and an energy optimization module. The data capturing module may capture data from a plurality of data sources at a predefined interval of time. The data may be captured pertaining to a specific domain and a specific geographical area. In one aspect, the plurality of data sources may comprise digital data and non-digital data. The forecasting module may forecast demand of energy to be consumed by energy utilities in the specific domain and the geographical area upon analyzing the data. The demand of energy may be forecasted by using at least one forecasting technique. The position gap determination module may determine a position gap indicating a difference between the demand of energy and supply of energy, generated by a plurality of energy generation sources, for a predetermined time. The energy optimization module may identify at least one energy pool, from a plurality of energy pools, for retrieving a deficit of the demand of energy in order to fulfill the demand of energy in the specific domain and the geographical area. In one aspect, the at least one energy pool may be identified based on a set of parameters. The energy optimization module may further provide the deficit of the demand of energy retrieved from the at least one energy pool in order to bridge the position gap between the demand of energy and the supply of energy thereby facilitating optimization of energy in the distributed environment.

In another implementation, a method for facilitating optimization of energy in a distributed environment is disclosed. In order to facilitate optimization of energy, initially, data may be captured from a plurality of data sources at a predefined interval of time. In one aspect, the data may be captured pertaining to a specific domain and a specific geographical area. In one aspect, the plurality of data sources may comprise digital data and non-digital data. Upon capturing the data, demand of energy to be consumed by energy utilities in the specific domain and the geographical area may be forecasted upon analyzing the data. In one aspect, the demand of energy may be forecasted by using at least one forecasting technique. Subsequent to the forecasting, a position gap may be determined. The position gap indicates a difference between the demand of energy and supply of energy, generated by a plurality of energy generation sources, for a predetermined time. After determining the position gap, at least one energy pool from a plurality of energy pools may be identified for retrieving a deficit of the demand of energy in order to fulfill the demand of energy in the specific domain and the geographical area. In one aspect, the at least one energy pool may be identified based on a set of parameters. Subsequently, the deficit of the demand of energy retrieved from the at least one energy pool may be provided to bridge the position gap between the demand of energy and the supply of energy. In one aspect, the aforementioned method for facilitating optimization of energy in the distributed environment may be performed by a processor using programmed instructions stored in a memory.

In yet another implementation, a non-transitory computer readable medium embodying a program executable in a computing device for facilitating optimization of energy in a distributed environment is disclosed. The program comprising a program code for capturing data from a plurality of data sources at a predefined interval of time, wherein the data is captured pertaining to a specific domain and a specific geographical area, and wherein the plurality of data sources comprises digital data and non-digital data. The program may further comprise a program code for forecasting demand of energy to be consumed by energy utilities in the specific domain and the geographical area upon analyzing the data, wherein the demand of energy is forecasted by using at least one forecasting technique. The program may further comprise a program code for determining a position gap indicating a difference between the demand of energy and supply of energy, generated by a plurality of energy generation sources, for a predetermined time. The program may further comprise a program code for identifying at least one energy pool, from a plurality of energy pools, for retrieving a deficit of the demand of energy in order to fulfill the demand of energy in the specific domain and the geographical area, wherein the at least one energy pool is identified based on a set of parameters. The program may further comprise a program code for providing the deficit of the demand of energy retrieved from the at least one energy pool in order to bridge the position gap between the demand of energy and the supply of energy thereby facilitating optimization of energy in the distributed environment.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

Figure 1:
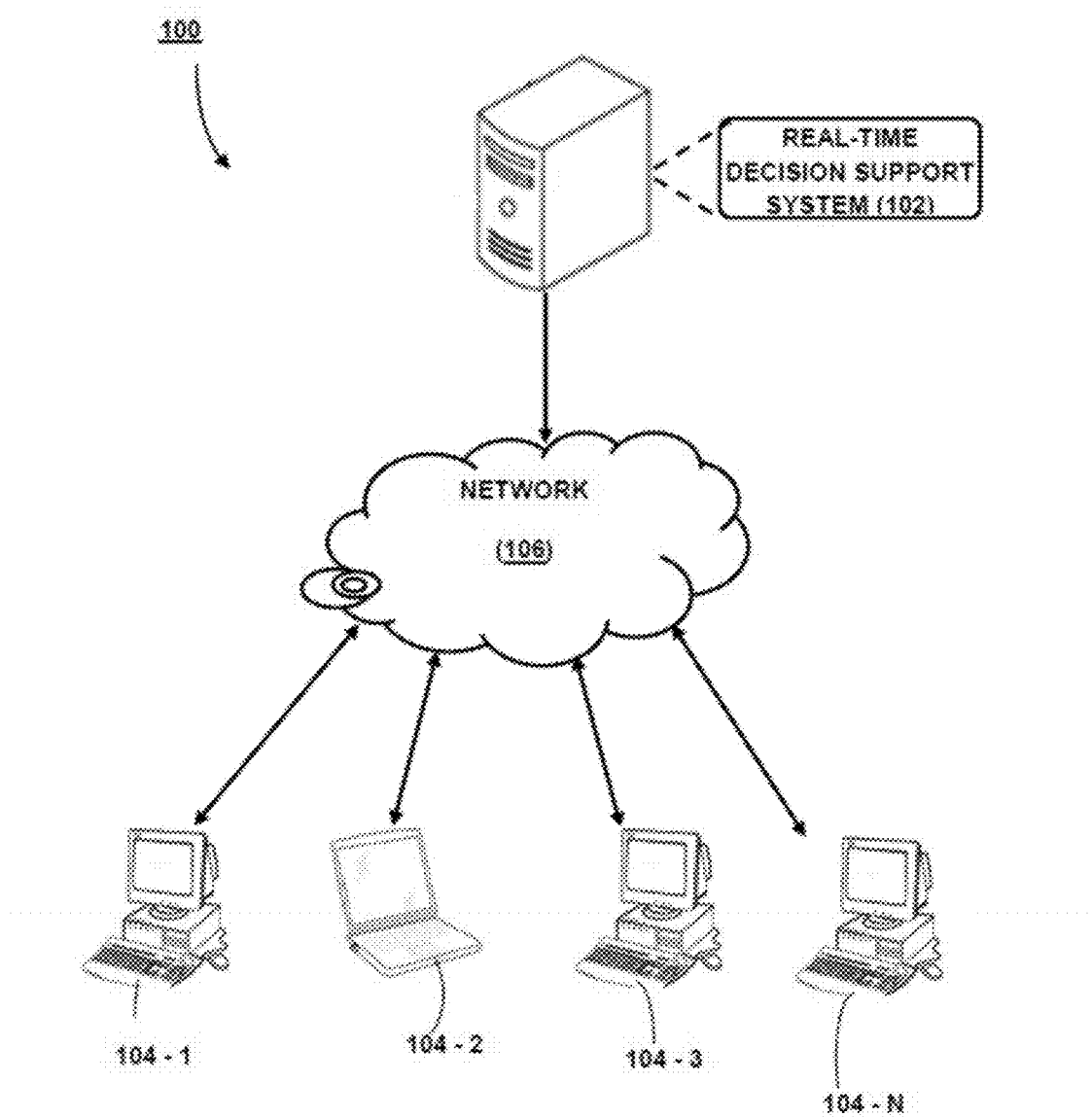
FIG. 1 illustrates a network implementation of a real-time decision support system for facilitating optimization of energy in a distributed environment, in accordance with an embodiment of the present invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. For example, although the present disclosure will be described in the context of a system and method for facilitating optimization of energy in a distributed environment, one of ordinary skill in the art will readily recognize that the method and system can be utilized in any situation where there is need to facilitate optimization of energy consumed by the energy utilities in the distributed environment. Thus, the present disclosure is not intended to be limited to the embodiments illustrated, but is to be accorded the widest scope consistent with the principles and features described herein.

Energy demand has always been volatile; with the changing energy mix energy generation is getting volatile too. For a developing nation, the enormity of the challenges with pressures on both demand side and supply side is only increasing day by day. Ensuring that the energy utilities are able to meet the ever-growing demand without adding to its carbon footprint, all available renewable power sources are harnessed efficiently to meet the ever growing demand. Unless the energy utilities move towards fully automated intelligent decision support system, the challenges are only likely to grow over a period of time. Under such emerging scenarios, it's getting more and more difficult for the energy utilities across the value chain to match a position gap between energy demand and energy supply.

In order to over to overcome the challenges observed in the existing art, a real-time decision support system for facilitating optimization of energy in a distributed environment is disclosed. The real-time decision support system provides real-time distributed forecast across wide area network at various levels of aggregation, optimization across parameter of interest for energy utilities in stochastic sense. The real-time decision support system also provides rich intelligence visualization for Peta-bytes of real time data, further depicts real-time intelligence based on suggestive measures. The real-time decision support system further allows a user to incorporate real-time emerging constrains in order to facilitate optimization of energy in the distributed environment.

For facilitating the optimization of energy, the real-time decision support system captures data across various data sources including, but not limited, ground sensor data, network sensor data, energy meter data, and satellite image data. In one aspect, the data may be captured includes energy data and all the other data which has an impact on either demand of energy or supply of energy. Upon capturing the data, the demand of energy to be consumed by energy utilities in the specific domain and the geographical area may be forecasted upon analyzing the data. In one aspect, the demand of energy may be forecasted by using at least one forecasting technique. Subsequent to the forecasting, a position gap indicating a difference between the demand of energy and the supply of energy may be determined for a predetermined time. After identifying the at least one energy pool, the deficit of the demand of energy retrieved from the at least one energy pool may be provided in order to bridge the position gap between the demand of energy and the supply of energy.

In one embodiment, the real-time decision support system further comprises of network of subsystems to generate various optimizations in the distributed environment at various levels and then allows aggregation all such sub systems to optimize at the aggregated level leveraging inbuilt dynamic stochastic optimizer. Thus, based on the above, it may be understood that the real-time decision support system helps the energy utilities leveraging data captured from smart network, sensors, energy meters data in conjunction with satellite image data across wide area to help achieve the following broad objective including, but not limited to, optimize energy dispatch and schedule, increase available power at a reduced cost, optimize across the energy generation sources to optimally meet the ever changing load, and improve the overall financial health of the energy utilities leveraging real-time data.

While aspects of described system and method for facilitating optimization of energy in the distributed environment and may be implemented in any number of different computing systems, environments, and/or configurations, the embodiments are described in the context of the following exemplary system.

Referring now to FIG. 1, a network implementation 100 of a real-time decision support system 102 for facilitating optimization of energy in a distributed environment is disclosed. In order to facilitate optimization of energy, initially, the real-time decision support system 102 captures data from a plurality of data sources at a predefined interval of time. In one aspect, the data may be captured pertaining to a specific domain and a specific geographical area. In one aspect, the plurality of data sources may comprise digital data and non-digital data. Upon capturing the data, the real-time decision support system 102 further forecasts demand of energy to be consumed by energy utilities in the specific domain and the geographical area upon analyzing the data. In one aspect, the demand of energy may be forecasted by using at least one forecasting technique. Subsequent to the forecasting, the real-time decision support system 102 further determines a position gap indicating a difference between the demand of energy and supply of energy, generated by a plurality of energy generation sources, for a predetermined time. After determining the position gap, the real-time decision support system 102 further identifies the at least one energy pool from a plurality of energy pools, for retrieving a deficit of the demand of energy in order to fulfill the demand of energy in the specific domain and the geographical area. The real-time decision support system 102 further provides the deficit of the demand of energy retrieved from the at least one energy pool in order to bridge the position gap between the demand of energy and the supply of energy.

Although the present disclosure is explained by considering that the real-time decision support system 102 is implemented as an application on a server, it may be understood that the real-time decision support system 102 may also be implemented in a variety of computing systems, such as a laptop computer, a desktop computer, a notebook, a workstation, a mainframe computer, a network server, and the like. It will be understood that the real-time decision support system 102 may be accessed by multiple users through one or more user devices 104-1, 104-2 . . . 104-N, collectively referred to as user devices 104 hereinafter, or applications residing on the user devices 104. In one implementation, the real-time decision support system 102 may comprise the cloud-based computing environment in which a user, interchangeably may referred to as a consumer, may operate individual computing systems configured to execute remotely located applications. Examples of the user devices 104 may include, but are not limited to a mobile phone, a smart phone, a portable computer, a personal digital assistant, a handheld device, and a workstation. The user devices 104 are communicatively coupled to the real-time decision support system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2A:
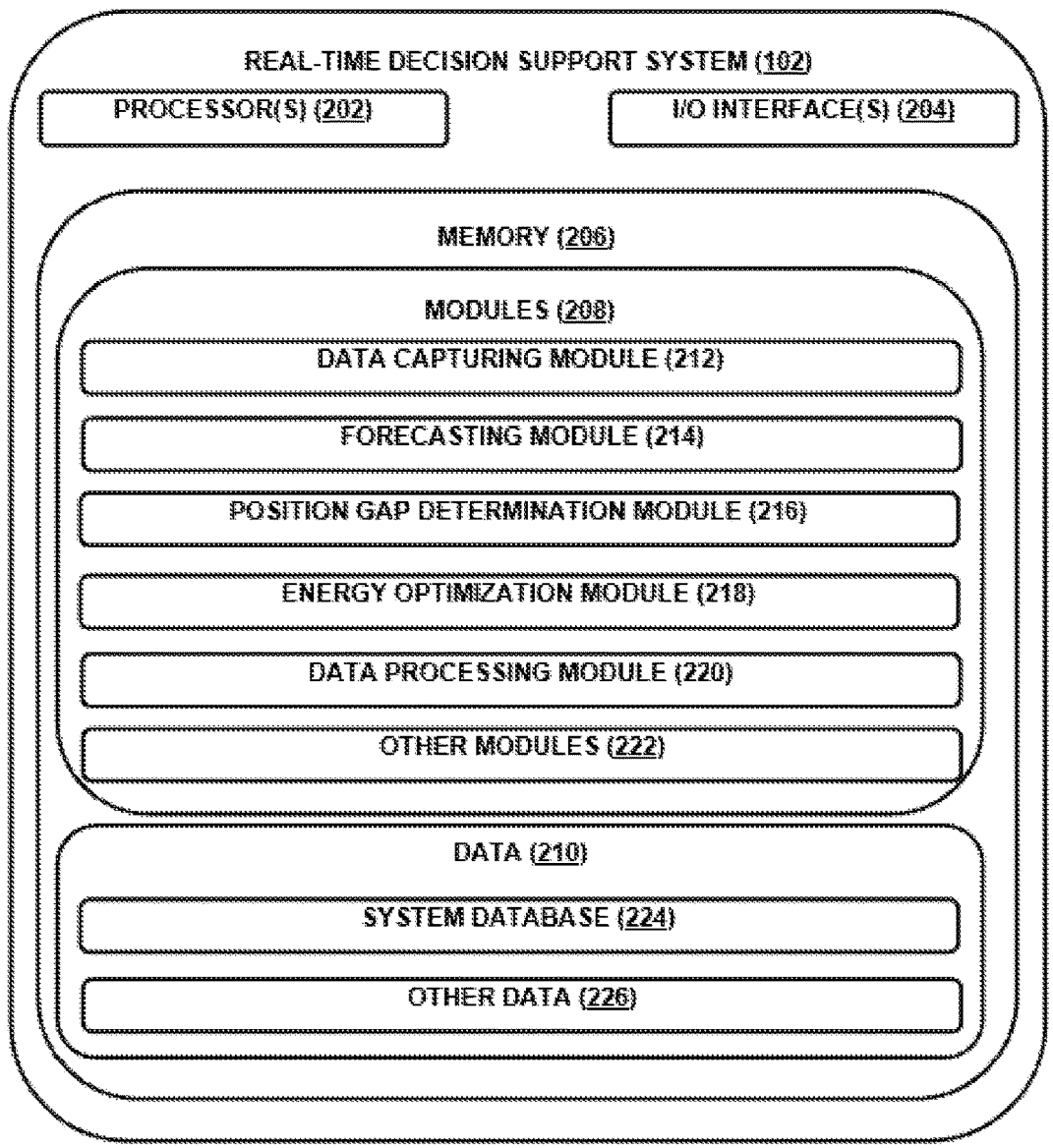
FIG. 2(A) and FIG. 2(B) illustrate the real-time decision support system, in accordance with an embodiment of the present subject matter.

Referring now to FIG. 2(A), the real-time decision support system 102 is illustrated in accordance with an embodiment of the present subject matter. In one embodiment, the real-time decision support system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the real-time decision support system 102 to interact with the user directly or through the client devices 104. Further, the I/O interface 204 may enable the real-time decision support system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a data capturing module 212, a forecasting module 214, a position gap determination module 216, an energy optimization module 218, a data processing module 220, and other modules 222. The other modules 222 may include programs or coded instructions that supplement applications and functions of the real-time decision support system 102. The modules 208 described herein may be implemented as software modules that may be executed in the cloud-based computing environment of the real-time decision support system 102.

Figure 2B:
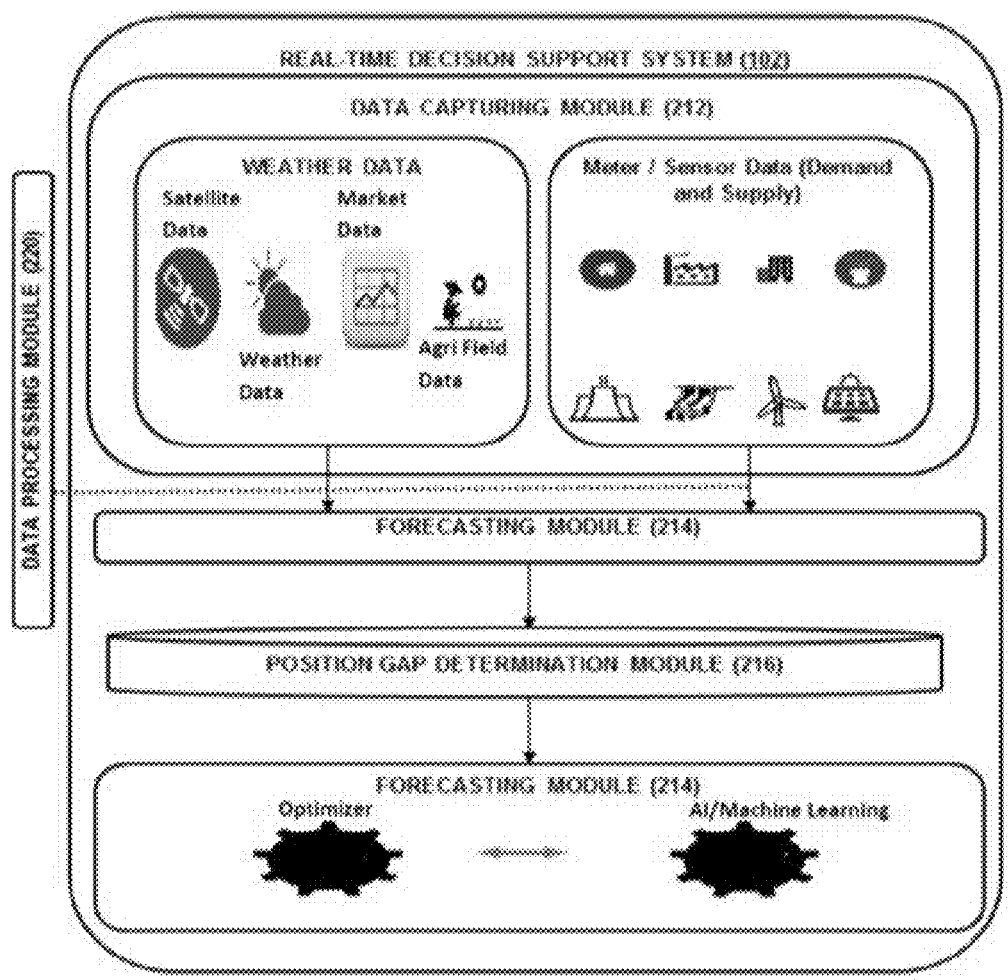

The data 210, amongst other things, serves as a repository for storing data processed, received, and generated by one or more of the modules 208. The data 210 may also include a system database 224 and other data 226. The other data 226 may include data generated as a result of the execution of one or more modules in the other modules 222. The detailed description of the modules 208 along with other components of the real-time decision support system 102 is further explained by referring to FIG. 2(B) and FIG. 3.

It may be understood that with the changing energy mix, energy demand and energy generation, hereinafter also referred to as 'energy supply', are getting volatile. For a developing nation, the enormity of the challenges with pressures on both the energy demand and the energy supply are only increasing day by day. Ensuring that energy utilities are able to meet the ever-growing energy demand without adding to its carbon footprint, all available renewable power generation sources are harnessed efficiently to meet the ever growing energy demand. Unless the energy utilities move towards fully automated intelligent decision support system, the challenges are only likely to grow over a period of time. Under such emerging scenarios, it's getting more and more difficult for the energy utilities across the value chain to bridge a position gap between the energy supply and the energy demand.

In order to bridge the position gap between the energy supply and the energy demand, a real-time decision support system 102 for facilitating optimization of energy in a distributed environment is disclosed. In one implementation, at first, a user may use the user device 104 to access the real-time decision support system 102 via the I/O interface 204. The user may register themselves using the I/O interface 204 in order to use the real-time decision support system 102. In one aspect, the user may access the I/O interface 204 of the real-time decision support system 102 for facilitating optimization of energy consumed by energy utilities in the distributed environment. In order to facilitate the optimization of energy, the real-time decision support system 102 may employ the plurality of modules i.e. the data capturing module 212, the forecasting module 214, the position gap determination module 216, the energy optimization module 218, and the data processing module 220. The detailed working of the plurality of modules 208 is described below.

Figure 3:
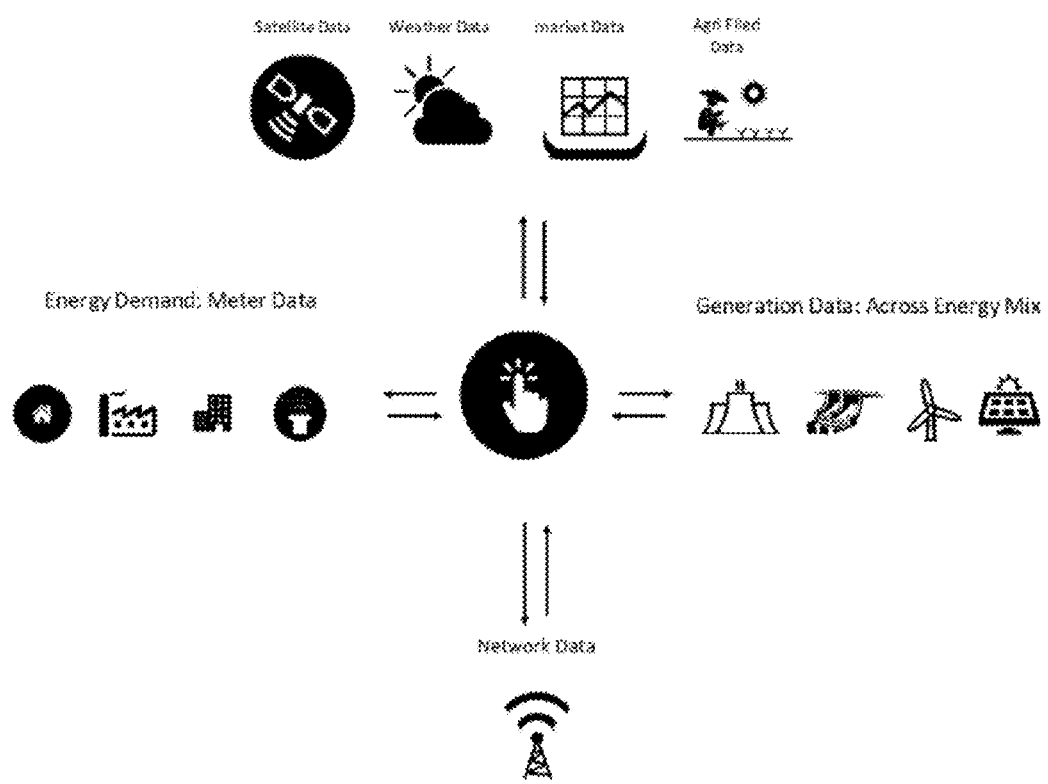
FIG. 3 and FIG. 4 illustrate an example, in accordance with an embodiment of the present subject matter.

The data capturing module 212 captures data from a plurality of data sources at a predefined interval of time. In one aspect, the data may be captured pertaining to a specific domain and a specific geographical area. It may be noted that the detailed description may be explained for an agriculture domain but may also be implemented in any other domain where optimization of energy is necessitated. Examples of the plurality of data sources, as illustrated in FIG. 3, may include, but not limited to, satellite image data, weather data, market data, agricultural field data, sensor data captured from a transmission network, automatic update from sources including web from many components distributed in the transmission network, energy meter data indicating demand of energy consumption, and energy generation data amongst energy mix indicating supply of energy. Upon capturing the data, as illustrated in the FIG. 3, the data may be aggregated together for forecasting the demand of energy and the supply of energy. In one aspect, since the data sources may comprise digital data and non-digital data, the data may be captured in an unstructured format.

Therefore, in order to convert the data from the unstructured format into a structured format, the data captured may further be processed by the data processing module 220. In one aspect, the data processing module 220 processes the data by converting the non-digital data into the digital data by using at least one image processing technique. Upon converting the non-digital data into the digital data, the data processing module 220 performs at least one of data processing technique including transforming, filtering, and smoothening on the digital data. In one aspect, the at least one processing technique may be performed to convert the data from the unstructured format into the structured format. Subsequent to the conversion to the structured format, the data processing module 220 stores the data, in the structured format, in the system database 224 for future reference.

In one embodiment, after converting the data into the structured format, the data capturing module 212 integrates the weather data captured across all available sources, including satellite images, in order to determine an area of interest that may be affected due to varying weather conditions including cloud cover. This change in the weather conditions may further affect both the demand of energy and the supply of energy. In addition to above, the data capturing module 212 further integrates ground weather station data with the satellite images in order to generate continuous weather map across by intelligently imputing weather data for locations which may or may not have weather station. It may be understood that the demand of energy in an irrigation domain is considered as the most volatile. In order to forecast the demand of energy faced by the load serving utilities, it becomes very critical to forecast the impact of the weather conditions in the demand of energy pertaining to the irrigation domain. In one aspect, the demand of energy in the irrigation domain is a function of soil quality, crops, growth stage of the crop and the prevailing weather condition.

For example, if rainfall in an arid zone followed by subsequent sun shine may bring the load back. On the other hand, if the rainfall happens in black soil zone which is having the ability to hold moisture, the growth in the irrigation load with subsequent sunshine may not be as rapid as in case of the arid zone. Therefore, it becomes utmost important to determine the ground conditions along with weather conditions to estimate the true effect of the demand of energy in the irrigation domain. Moreover, which crop and what growth stage the crop may also help in determining the irrigation requirement hence the demand of energy. In such a scenario, the real-time decision support system 102 leverages the satellite images in order to classify the quality of the soil based on ability to hold moisture which is in a way static. In one aspect, the real-time decision support system 102 may also leverage periodic multispectral images captured by orbiting satellite after every '15' days to estimate the growth stage of the crop. Thus, the satellite images become the most critical inputs for forecasting the demand of energy in the irrigation domain.

In addition to the above, the irrigation requirements, such as growth of crop, play a vital role in the irrigation load. In one aspect, the growth of crop may be determined based on the satellite images. The satellite images may then be processed in order to determine a total cultivated area at the specific geographical area. In one embodiment, the satellite image may further facilitate to determine the growth rate of the crop in the specific geographical area. This may help the real-time decision support system 102 to determine the irrigation requirement and hence determine the demand of energy for the crop in the specific geographical area.

Subsequently, the forecasting module 214 may forecast the demand of energy to be consumed by energy utilities in the specific domain and the geographical area upon analyzing the data captured by the data capturing module 212. In one aspect, the demand of energy may be forecasted by using at least one forecasting technique. Examples of the at least one forecasting technique may include, but not limited to, a Deep Learning Neural Network, a Support vector machine, a Generalized Regression Network and a Hybrid Fuzzy Model. In one aspect, the forecasting module 214 further computes a weight corresponding to each forecasting technique used for forecasting the demand of energy and thereby opts a best forecasting technique, amongst the forecasting techniques based on the score. It may be understood that the forecasting module 214 may also consider multitude of weather parameters available from on the ground weather station data along with weather forecast in order to forecast the demand of energy. The forecasting module 214 may then process the ground weather station data and the satellite images in order to forecast the demand of energy for the area of interest and thereby ensuring that the forecasting module 214 forecasts without any loss of weather information.

Figure 4:
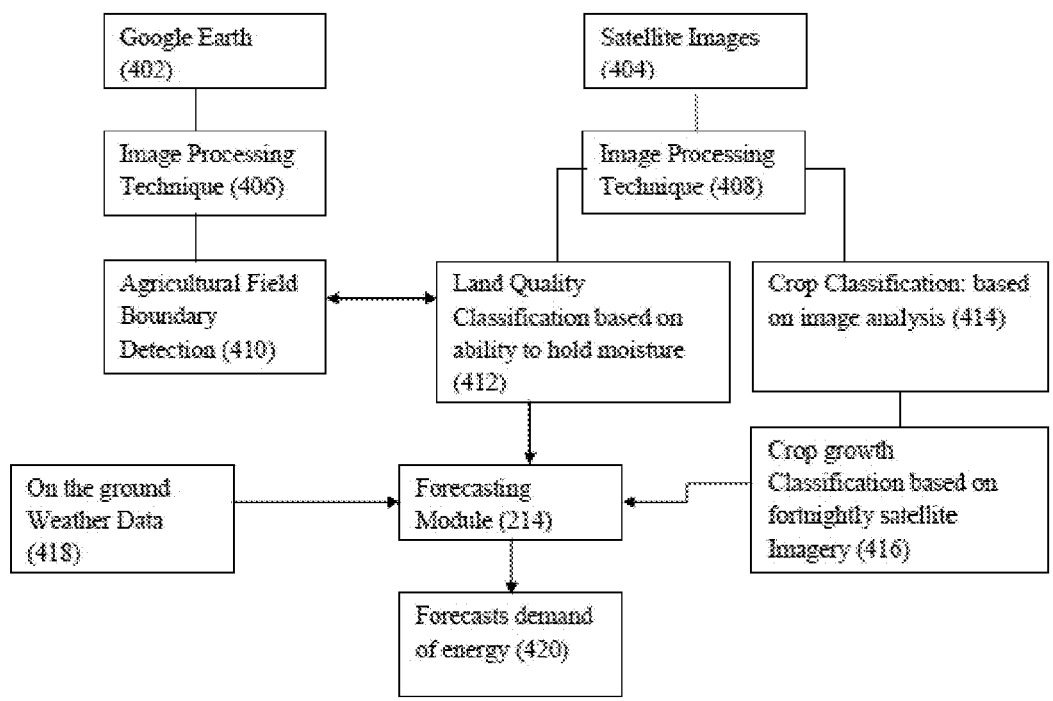

In order to elucidate the functioning of the aforementioned modules, consider an example, as illustrated in FIG. 4, where a workflow for the determining the demand of energy in the irrigation domain is shown. Initially, the data capturing module 212 captures the data i.e. Google™ images from Google Earth™ and satellite images as shown in block 402 and block 404 respectively. Upon capturing the images, the data processing module 220 processes the Google™ images and the satellite images using at least one data processing technique as shown in block 406 and block 408 respectively. It may be understood that the Google™ images are processed to determine an agricultural field, as shown in block 410, indicating the area of interest. On the other hand, the satellite images are processed to determine land quality based on ability to hold moisture and crop classification as shown in block 412 and block 414 respectively. In one aspect, the data capturing module 212 captures the satellite images for predetermined time by orbiting satellite in order to estimate the growth rate of the crop as shown in block 416.

Subsequently, the forecasting module 214 forecasts the demand of energy for the agricultural domain and the area of interest. In one aspect, the forecasting module 214 leverages on the ground weather data, as shown in block 418 and the growth rate of the crop as shown in the block 416. Based on the ground weather data and the growth rate of the crop, the forecasting module 214 forecasts the demand of energy, as shown in block 420, to be consumed by energy utilities in the agricultural domain.

After forecasting the demand of energy, the position gap determination module 216 determines a position gap indicating a difference between the demand of energy and supply of energy, generated by a plurality of energy generation sources, for a predetermined time. In one aspect, the position gap determination module 216 allows the user to determine the gap between the demand of energy and the supply of energy. In one aspect, the position gap determination module 216 further facilitates the user to aggregate the supply of energy from various sources including, but not limited to, bilateral, distributed generation, renewable energy sources and banked power including captive power plants.

Subsequent to the determination of the position gap, the energy optimization module 218 identifies at least one energy pool, from a plurality of energy pools, for retrieving a deficit of the demand of energy in order to fulfill the demand of energy in the specific domain and the geographical area. In one aspect, the at least one energy pool may be identified based on a set of parameters. Examples of the set of parameters may include, but not limited to, current state of the pool, potential ramp-up and ramp-down constraints, frequency of a grid in order to ensure that the position gap is optimally matched satisfying both technical and economic parameters. Upon identifying the at least one energy pool, the energy optimization module 218 further provides the deficit of the demand of energy retrieved from the at least one energy pool in order to bridge the position gap between the demand of energy and the supply of energy.

In one aspect, the energy optimization module 218 optimizes the energy to be consumed by the energy utilities by a) pool allocation optimization and b) energy source selection optimization within pool. In the pool allocation optimization, the energy optimization module 218 considers pool levels constrains in order to ensure that none of the pool level constraints are violated including transmission corridor constrains. It may be noted that the pool allocation optimization is dynamic in the sense that the pool itself is dynamic depending on stochastic transmission constrains which might break the market into segments depending on from where the power may potentially flow and where from it cannot. Based on the dynamic stochastic pool segmentation, the energy optimization module 218 optimally selects an individual energy source considering the set of parameters i.e. current state of the pool, potential ramp-up and ramp-down constraints, frequency of a grid in order optimize the energy to be consumed by energy utilities in the distributed environment. While optimization, the real-time decision support system 102 may consider both volumetric and price risk to ensure that the energy is made available at any given point in time at reasonable cost.

Based on an output of the energy optimization module 218, a report has been generated for facilitating the users to take necessary measures to optimize the energy to be consumed by the energy utilities in the distributed environment. For example, if the network is already smart (smart grid), the processed information is made available to stake holders to take optimal decisions for decision making in day to day energy management including trade optimization across market. In one aspect, the report indicates the demand of energy (along with linear and non-linear constrains), the supply of energy along with plant and unit details including maintenance schedule voluntary and involuntary stochastic interruptions, ramping constraints, network states, network congestions, current state, and units with must run status. It may be understood that the report may be display on a display unit of the real-time decision support system 102 for quick decision making and assimilation of information with real time drill down as per the user defined hierarchies.

Thus, in this manner, the real-time decision support system 102 overcomes the challenges observed in the existing art to facilitate optimization of the energy to be consumed by the energy utilities in the distributed environment.

Figure 5:
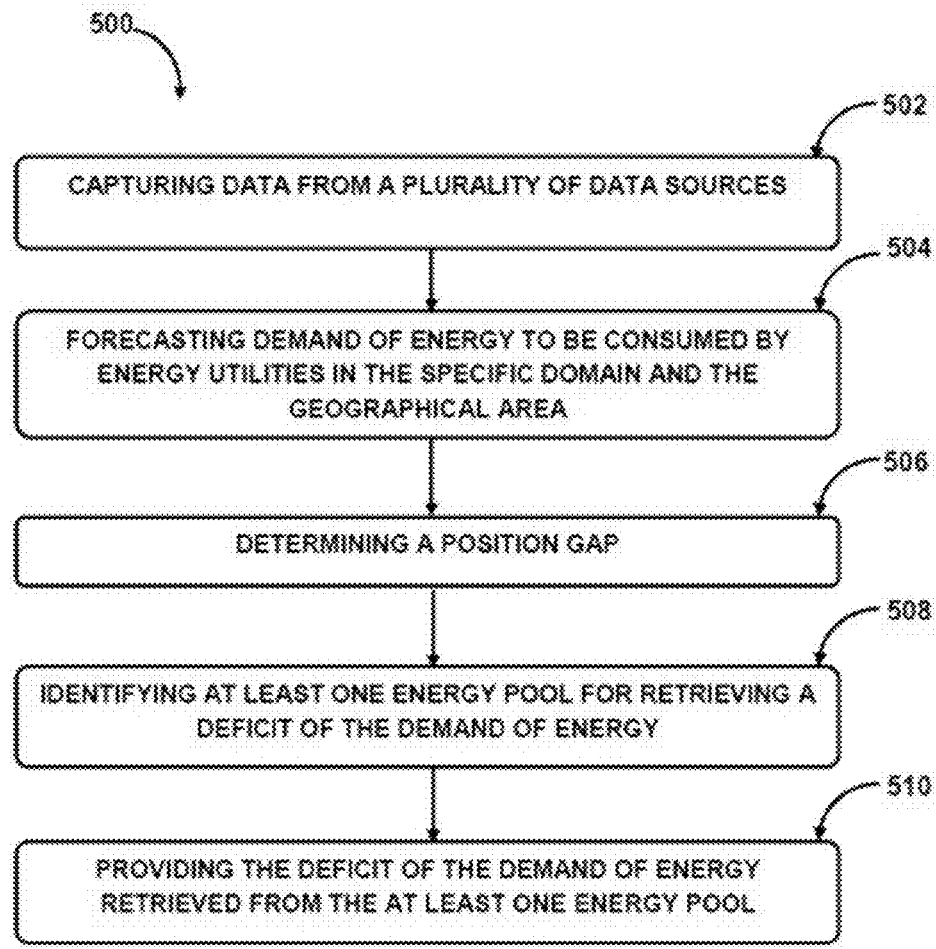
FIG. 5 illustrates a method for facilitating optimization of energy in the distributed environment, in accordance with an embodiment of the present disclosure.

Referring now to FIG. 5, a method 500 for facilitating optimization of energy to be consumed by energy utilities in a distributed environment is shown, in accordance with an embodiment of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the disclosure described herein. Furthermore, the method can be implemented in any suitable hardware, software, firmware, or combination thereof. However, for ease of explanation, in the embodiments described below, the method 500 may be considered to be implemented in the above described in the real-time decision support system 102.

At block 502, data from a plurality of data sources may be captured at a predefined interval of time. The data may be captured pertaining to a specific domain and a specific geographical area. In one aspect, the plurality of data sources may comprise digital data and non-digital data. In one implementation, the data may be captured by the data capturing module 212.

At block 504, demand of energy to be consumed by energy utilities in the specific domain and the geographical area may be forecasted. In one aspect, the demand of energy may be forecasted upon analyzing the data. The demand of energy may be forecasted by using at least one forecasting technique. In one implementation, the demand of energy may be forecasted by the forecasting module 214.

At block 506, a position gap indicating a difference between the demand of energy and supply of energy, generated by a plurality of energy generation sources, for a predetermined time may be determined. In one implementation, the position gap may be determined by the position gap determination module 216.

At block 508, at least one energy pool, from a plurality of energy pools, may be identified for retrieving a deficit of the demand of energy in order to fulfill the demand of energy in the specific domain and the geographical area. The at least one energy pool may be identified based on a set of parameters. In one implementation, the at least one energy pool may be identified by the energy optimization module 218.

At block 510, the deficit of the demand of energy retrieved from the at least one energy pool may be provided in order to bridge the position gap between the demand of energy and the supply of energy thereby facilitating consumed by energy utilities in the distributed environment. In one implementation, the deficit may be provided by the energy optimization module 218.

Some embodiments enable a system and a method to integrate comprehensive data capture data from various data sources in order to leverage all possible data elements that enriches intelligence in a real-time environment.

Some embodiments enable a system and a method to forecast energy demand and energy supply at various levels of granularity. The forecasting with hybrid approach leveraging various state of the art techniques including Deep Learning Neural network, Support vector machines, generalized Regression network and Hybrid Fuzzy models with ability to dynamically assign weights to individual forecast in order to ensure that the best available forecast is leveraged for decision making in real time dynamic environment.

Some embodiments enable a system and a method to reduce a position gap between the energy demand and the energy supply.

Although implementations for methods and systems for facilitating optimization of energy in a distributed environment have been described in language specific to structural features and/or methods, it is to be understood that the appended claims are not necessarily limited to the specific features or methods described. Rather, the specific features and methods are disclosed as examples of implementations for facilitating optimization of the energy in the distributed environment.

We claim:

1. A method for facilitating optimization of energy in a distributed environment, the method comprising:
    capturing, by a processor, data from a plurality of data sources at a predefined interval of time, wherein the data is captured pertaining to a specific domain and a specific geographical area, and wherein the plurality of data sources comprises digital data and non-digital data;
    determining, by the processor, an area of interest affecting demand of energy and supply of energy based on varying weather condition, wherein the varying weather condition is determined upon integrating weather data with ground weather station data and satellite data images;
    continuously analyzing, at a predefined time interval by the processor, the satellite data images to classify soil properties and growth rate of a crop in the area of interest in order to forecast the demand of energy to be consumed by energy utilities in the specific domain, wherein the demand of energy is forecasted by using at least one forecasting technique, and wherein forecasting further comprises
        computing a weight corresponding to each forecasting technique used for forecasting the demand of energy, wherein the forecasting technique comprises a Deep Learning Neural Network, a Support vector machine, a Generalized Regression Network and a Hybrid Fuzzy Model;
    determining, by the processor, a position gap indicating a difference between the demand of energy and supply of energy, generated by a plurality of energy generation sources, for a predetermined time;
    identifying, by the processor, at least one energy pool, from a plurality of energy pools, for retrieving a deficit of the demand of energy in order to fulfill the demand of energy in the specific domain and the geographical area, wherein the at least one energy pool is identified based on a set of parameters; and
    providing, by the processor, the deficit of the demand of energy retrieved from the at least one energy pool in order to bridge the position gap between the demand of energy and the supply of energy thereby facilitating optimization of energy in a distributed environment.

2. The method of claim 1, wherein the plurality of data sources comprises satellite image data, weather data, sensor data captured from a transmission network, automatic update from sources including web from many components distributed in the transmission network, market data, energy meter data indicating demand of energy consumption, and energy generation data amongst energy mix indicating supply of energy to be consumed.

3. The method of claim 1, wherein the data captured is further processed by
converting, by the processor, the non-digital data into the digital data by using at least one image processing technique,
performing, by the processor, at least one of data processing technique including transforming, filtering, and smoothening on the digital data, wherein the at least one processing technique is performed to convert the unstructured data into structured data, and
storing, by the processor, the structured data in a system database.

4. The method of claim 1, wherein the set of parameters comprises potential ramp-up and ramp-down constraints, frequency of a grid in order to ensure that the position gap is optimally matched satisfying technical parameter.

5. A real-time decision support system for facilitating optimization of energy in a distributed environment, the real-time decision support system comprising:
a processor; and
a memory coupled to the processor, wherein the processor is capable of executing a plurality of instructions which when executed cause the processor to:
capture data from a plurality of data sources at a predefined interval of time, wherein the data is captured pertaining to a specific domain and a specific geographical area, and wherein the plurality of data sources comprises digital data and non-digital data;
determine an area of interest affecting demand of energy and supply of energy based on varying weather condition, wherein the varying weather condition is determined upon integrating weather data with ground weather station data and satellite data images;
continuously analyze, at a predefined time interval, the satellite data images to classify soil properties and growth rate of a crop in the area of interest in order to forecast the demand of energy to be consumed by energy utilities in the specific domain, wherein the demand of energy is forecasted by using at least one forecasting technique, and wherein forecasting further comprises
computing a weight corresponding to each forecasting technique used for forecasting the demand of energy, wherein the forecasting technique comprises a Deep Learning Neural Network, a Support vector machine, a Generalized Regression Network and a Hybrid Fuzzy Model;
determine a position gap indicating a difference between the demand of energy and supply of energy, generated by a plurality of energy generation sources, for a predetermined time;
identify at least one energy pool, from a plurality of energy pools, for retrieving a deficit of the demand of energy in order to fulfill the demand of energy in the specific domain and the geographical area, wherein the at least one energy pool is identified based on a set of parameters, and
provide the deficit of the demand of energy retrieved from the at least one energy pool in order to bridge the position gap between the demand of energy and the supply of energy thereby facilitating optimization of energy in a distributed environment.

6. The real-time decision support system of claim 5, wherein the plurality of data sources comprises satellite image data, weather data, sensor data captured from a transmission network, automatic update from sources including web from many components distributed in the transmission network, market data, energy meter data indicating demand of energy consumption, and energy generation data amongst energy mix indicating supply of energy to be consumed.

7. The real-time decision support system of claim 5 further causing the processor to process the data captured by
converting the non-digital data into digital into the digital data by using at least one image processing technique,
performing at least one of data processing technique including transforming, filtering, and smoothening on the digital data, wherein the at least one processing technique is performed to convert the unstructured data into structured data, and
storing the structured data in a system database.

8. The real-time decision support system of claim 5, wherein the set of parameters comprises potential ramp-up and ramp-down constraints, frequency of a grid in order to ensure that the position gap is optimally matched satisfying technical parameter.

9. A non-transitory computer readable medium embodying a program executable in a computing device for facilitating optimization of energy in a distributed environment, the program comprising a program code:
a program code for capturing data from a plurality of data sources at a predefined interval of time, wherein the data is captured pertaining to a specific domain and a specific geographical area, and wherein the plurality of data sources comprises digital data and non-digital data;
a program code for determining an area of interest affecting demand of energy and supply of energy based on varying weather condition, wherein the varying weather condition is determined upon integrating weather data with ground weather station data and satellite data images;
a program code for continuously analyzing, at a predefined time interval by the processor, the satellite data images to classify soil properties and growth rate of a crop in the area of interest in order to forecast the demand of energy to be consumed by energy utilities in the specific domain, wherein the demand of energy is forecasted by using at least one forecasting technique, and wherein forecasting further comprises
computing a weight corresponding to each forecasting technique used for forecasting the demand of energy, wherein the forecasting technique comprises a Deep Learning Neural Network, a Support vector machine, a Generalized Regression Network and a Hybrid Fuzzy Model;
a program code for determining a position gap indicating a difference between the demand of energy and supply of energy, generated by a plurality of energy generation sources, for a predetermined time;
a program code for identifying at least one energy pool, from a plurality of energy pools, for retrieving a deficit of the demand of energy in order to fulfill the demand of energy in the specific domain and the geographical area, wherein the at least one energy pool is identified based on a set of parameters; and
a program code for providing the deficit of the demand of energy retrieved from the at least one energy pool in order to bridge the position gap between the demand of energy and the supply of energy thereby facilitating optimization of energy in a distributed environment.

\* \* \* \* \*